UNITED STATES PATENT OFFICE.

ROBERT L. TUDOR, OF CINCINNATI, OHIO, ASSIGNOR OF ONE-HALF TO GEO. A. SPRINGMEIER, OF SAME PLACE.

COMPOSITION FOR SOFTENING ENAMELED LEATHER.

SPECIFICATION forming part of Letters Patent No. 481,516, dated August 23, 1892.

Application filed December 18, 1891. Serial No. 415,538. (No specimens.)

*To all whom it may concern:*

Be it known that I, ROBERT L. TUDOR, a citizen of the United States, residing at Cincinnati, in the county of Hamilton and State of Ohio, have invented a new and useful Improvement in a Composition of Matter for Softening Enameled Leather, which improvement is fully set forth in the following specification.

My composition consists of the following ingredients combined in the manner and proportions stated, viz: pure white soap, two ounces; washing-powder, one ounce; pure water, one gallon; vinegar, ten ounces. The washing-powder, being mainly composed of sal-soda and borax, has been found peculiarly adapted to the purpose, and being easily obtainable is preferred on the score of convenience. The soap and washing-powder are first dissolved by being boiled in the water. Any impurities that may rise during the process should be carefully removed. When the solution becomes cool, the vinegar is added and the ingredients thoroughly mingled by agitation.

The composition is utilized by steeping the leather therein until the enamel becomes permeated. A half-hour or less is generally sufficient for that purpose.

It is well known that in the process of manufacturing shoes and other articles of patent leather the enameled surface becomes cracked and defaced and loses its luster. The application of my compound effectually prevents that result. The enamel is rendered pliable and elastic. While in this condition the leather may be stretched and crimped, as in shoe-making, without losing its brilliancy.

It will be understood that the use of my invention is not confined to patent and enameled leather, but is equally applicable to cloth or other fabrics having an enameled surface.

What I claim as new is—

The herein-described composition of matter for softening enameled and patent leather or cloth, consisting of pure white soap, washing-powder, vinegar, and pure water combined in the proportions herein specified.

In testimony that I claim the foregoing I have hereunto set my hand, this 2d day of December, 1891, in the presence of witnesses.

ROBERT L. TUDOR.

Witnesses:
 WM. REINERT,
 JOHN W. WOLFE.